United States Patent [19]

Hama

[11] 4,395,210
[45] Jul. 26, 1983

[54] APPARATUS FOR MANUFACTURE OF TURBULENCE MEMBER MADE OF SYNTHETIC RESIN

[75] Inventor: Mamoru Hama, Chino, Japan

[73] Assignees: Mihama Manufacturing Co., Ltd.; Kato Hatsujo Kaisha, Ltd., both of Japan

[21] Appl. No.: 323,704

[22] Filed: Nov. 20, 1981

[30] Foreign Application Priority Data

Nov. 21, 1980 [JP] Japan .................. 55-164820

[51] Int. Cl.³ .......................................... B29C 17/00
[52] U.S. Cl. ........................ 425/71; 264/103;
264/177 R; 264/178 R; 264/210.2; 425/319;
425/376 B; 425/377; 425/381; 425/391
[58] Field of Search .......... 264/177 R, 177 F, 178 R,
264/178 F, 103, 210.2, 281; 425/71, 319, 381,
376 B, 388, 377, 391

[56] References Cited

U.S. PATENT DOCUMENTS

| | | | |
|---|---|---|---|
| 1,889,165 | 11/1932 | Walker | 264/210.2 |
| 2,199,825 | 5/1940 | Kretchmer | 425/319 |
| 2,347,036 | 4/1944 | Dumont | 264/210.2 |
| 2,423,260 | 7/1947 | Slaughter | 264/210.2 |
| 2,573,050 | 10/1951 | Orsini | 425/376 B |
| 2,728,104 | 12/1955 | Fisch | 264/177 R |
| 2,743,511 | 5/1956 | Genovese | 264/177 F |
| 3,164,947 | 1/1965 | Gaston | 264/177 R |
| 3,164,948 | 1/1965 | Stratford | 264/177 R |
| 3,169,272 | 2/1965 | Maxson | 425/377 |
| 3,351,205 | 11/1967 | Butler et al. | 264/177 F |
| 3,441,637 | 4/1969 | Davis | 264/178 R |
| 3,605,162 | 9/1971 | Long | 264/177 F |
| 3,685,147 | 8/1972 | Nevin et al. | 264/177 R |
| 3,852,152 | 12/1974 | Werner et al. | 264/178 F |
| 4,181,486 | 1/1980 | Saito | 264/177 R |
| 4,285,899 | 8/1981 | Pavy et al. | 425/319 |

FOREIGN PATENT DOCUMENTS

| | | | |
|---|---|---|---|
| 2302847 | 11/1976 | France | 425/376 B |
| 49-1314 | 12/1974 | Japan | 425/376 B |

Primary Examiner—Jeffery R. Thurlow
Attorney, Agent, or Firm—Wenderoth, Lind & Ponack

[57] ABSTRACT

Turbulence members made of a synthetic resin are manufactured by a method which comprises melting a synthetic resin and causing the molten resin to be rotated around its axis and at the same time extruded in a state wherein the molten resin is spirally twisted by use of an extruding means provided with a rotary nozzle having a slit, passing the extruded molten resin under water in a cooling means thereby cooling and solidifying the extruded resin and drawing the resultant resin with a drawing means. The cooling means is provided with a relatively narrow and relatively wide chamber to facilitate uniformity and efficiency of production.

1 Claim, 12 Drawing Figures

APPARATUS FOR MANUFACTURE OF TURBULENCE MEMBER MADE OF SYNTHETIC RESIN

BACKGROUND OF THE INVENTION

The present invention relates to method and apparatus for the manufacture of a turbulence member made of a synthetic resin to be inserted in the form of pieces into paths for a fluid in a heat exchanger such as a radiator etc., when can enhance the effect of heat radiation or heat absorption of the heat exchanger.

There have heretofore been proposed turbulence members made from a thin metallic ribbon, which are each molded to be composed of two wave-formed strips in different phases by press working etc. These turbulence members have been inserted in the form of pieces into fluid paths in a heat exchanger such as a radiator etc. so as to stir the fluid and to enhance the effect of heat radiation or absorption.

However, these metallic turbulence members have disadvantages in that when these are rolled around a reel, the ridges of the wave-formed strips thereof are crushed thereby entangling the strips and in, that since the metallic turbulence pieces of a given size into which the metallic turbulence members are cut are kept bent in the form of an arc, the bent portions thereof must manually be reformed one by one, when inserting the turbulence pieces into the fluid paths in a heat exchanger, thereby entailing very troublesome work and much time and labor. Moreover since the turbulence pieces are made of a metal, the weight of the heat exchanger is increased.

SUMMARY OF THE INVENTION

One object of the present invention is to provide a method for the manufacture of plastic turbulence members excellent in precision at a high working speed.

Another object of the present invention is to provide an apparatus for the manufacture of plastic turbulence members excellent in precision at a high working speed.

To attain the objects described above according to the present invention, there is provided a method for the manufacture of turbulence members made of a synthetic resin comprising the steps of extruding the resin melted by heat in an extruding means from a slit in a rotary nozzle of the extruding means while the molten resin is rotated around its central axis, thereby automatically giving a spiral twist to the molten resin, and passing the extruded resin under water thereby cooling and solidifying the extruded resin, and there is also provided an apparatus for the manufacture of turbulence members made of a synthetic resin comprising an extruding machine for melting the resin by heat therein and extruding the molten resin therefrom, a rotary nozzle rotatably attached to the extruding machine and provided on the leading end thereof with a slit for allowing the molten resin to be rotated around its central axis thereof and extruded out of the slit of the rotary nozzle, a water vessel filled with water for cooling and solidifying therein the extruded resin, and a drawing device for drawing the cooled and solidified resin.

These objects and other objects and characteristic features of the present invention will become apparent from the further disclosure made hereinafter in detail with reference to the accompanying drawings.

DESCRIPTION OF THE PREFERRED EMBODIMENTS

Figure 1:
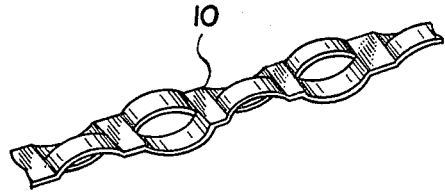
FIG. 1 is a perspective view illustrating a conventional turbulence member.

As illustrated in FIG. 1, the conventional turbulence member 10 is made from a thin metallic ribbon and molded to be composed of two wave-formed strips in different phases by press working etc.

Figure 2:
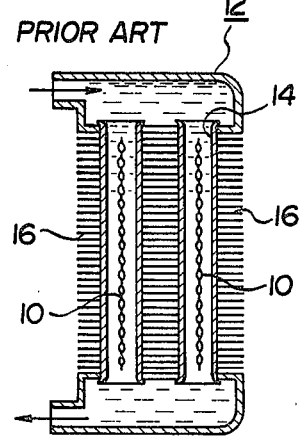
FIG. 2 is a cross-sectional view showing the turbulence pieces of the turbulence member in FIG. 1 used in a radiator.
Figure 3:
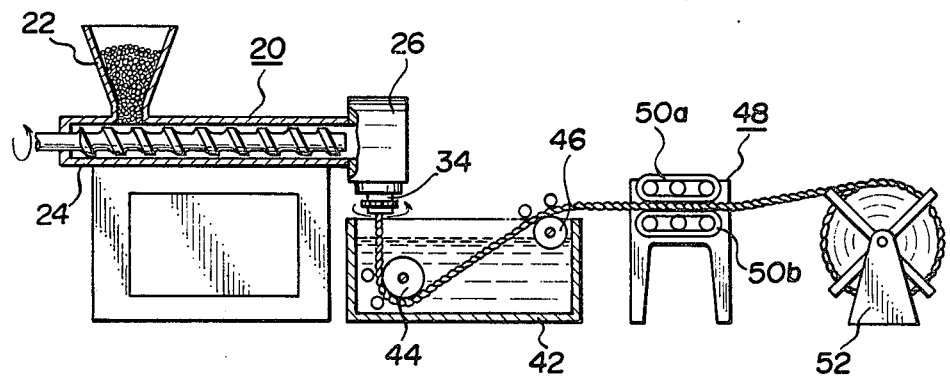
FIG. 3 is a schematic view illustrating one embodiment of the apparatus for the manufacture of plastic turbulence members according to the present invention.
Figure 4:
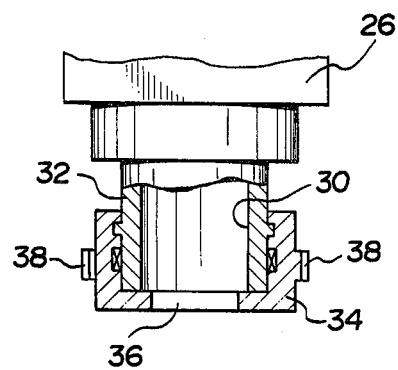
FIG. 4 is a cross-sectional view showing the portion of the nozzle used in the apparatus of FIG. 3.

20-30 Turbulence pieces 10 are inserted, as illustrated in FIG. 2, into paths 14 for hot water in a radiator 12 to stir the hot water, thereby heightening the conduction efficiency of heat to fins 16 and enhancing the effect of heat radiation.

However, these metallic turbulence members 10 entail disadvantages that when these are rolled around a reel, the ridges of the wave-formed strips thereof are crushed thereby entangling the strips, that since the pieces of a given size into which the turbulence members are cut have arc-like bent portions, the bent portions must be reformed manually one by one in inserting the turbulence pieces into the fluid paths 14 thereby requiring very troublesome work and much time and labor, and that since turbulence pieces are made of a metal, the weight of a radiator 12 is increased.

Under these circumstances, there have strongly been demanded method and apparatus for the manufacture of turbulence members capable of eliminating the disadvantages as described above.

The present invention has been accomplished in compliance with the aforementioned demand.

The present invention will be described in detail with reference to one embodiment shown in FIGS. 3-8.

The method of the present invention will be described in conjunction with the apparatus of the present invention because the method may be considered as the function of the apparatus.

Reference numeral 20 denotes an extruding machine in which a synthetic resin is melted by heat and extruded from the outlet thereof, 22 a hopper, 24 a screw and 26 a die head.

The die head 26 is provided on the underside thereof with a path 30 for guiding the molten resin from the extruding machine 20 in the perpendicular direction and with a swollen cylindrical portion 32 which protrudes downwardly.

Denoted by 34 is a cap-shaped rotary nozzle which stops up the underside of the swollen portion 32 and is rotatably attached to the outer periphery of the swollen portion.

A slit 36 is formed in the central leading end of the nozzle 34 and communicates with the path 30 of the swollen portion 32. The slit may be formed in the shape of a straight opening or a plurality of openings radially extending from the center thereof, as illustrated in FIGS. 6(A), 7(A) and 8(A).

The rotary nozzle 34 is rotated at variable speeds by causing a chain connected with a speed variable driving device (not shown) to be engaged with teeth 38 formed on the circumference of the nozzle. As for the speed variable driving apparatus, there may be used a suitable gear device, a belt, etc.

Below the leading end of the rotary nozzle 34, disposed is a water vessel 42 having a depth of about 1 meter, which is filled with water for the purpose of cooling the resin to be extruded from the slit 36.

The distance between the surface of the water in the water vessel 42 and the underside of the nozzle 34 can be adjusted by means such as providing the water vessel 42 with a water-supplying inlet and a water-discharging valve, by disposing the water vessel 42 on a suitable supporting base capable of adjusting the height thereof, etc.

Reference numeral 44 stands for a roller disposed on the lower inside of the water vessel 42 to be opposed to the leading end of the nozzle 34, and 46 stands for a guide roller disposed on the upper inside of the water vessel 42.

Denoted by 48 is a drawing device provided with a pair of opposed feed rollers 50a and 50b for drawing the resin from the water vessel at the same speed as that of the extruding machine 20 and guiding the resin between the feed rollers. Reference numeral 52 denotes a take-up reel for the resin.

The first embodiment of the apparatus according to the present invention is constructed as described above.

Now, the function of the first embodiment will be described in cooperation with the corresponding method.

Resin particles are introduced into the hopper 22 and melted by heat in the extruding machine 20. The molten resin is forwarded to the path 30 of the swollen portion 32 by means of the screw 24 and subsequently extruded in the perpendicular downward direction from the slit 36 of the rotating nozzle 34. When the downward direction is slightly inclined, the molten resin may possibly hang down in the perpendicular direction due to its own weight. Therefore, the downward direction is preferably perpendicular. The resin is then guided to the interior of the water vessel 42, led to the lower surface of the roller 44, then led to the upper surface of the guide roller 46 with the advancing direction reversed, pinched between the feed rollers 50a and 50b of the drawing device 48 and rolled around the take-up reel 52.

Figure 5:
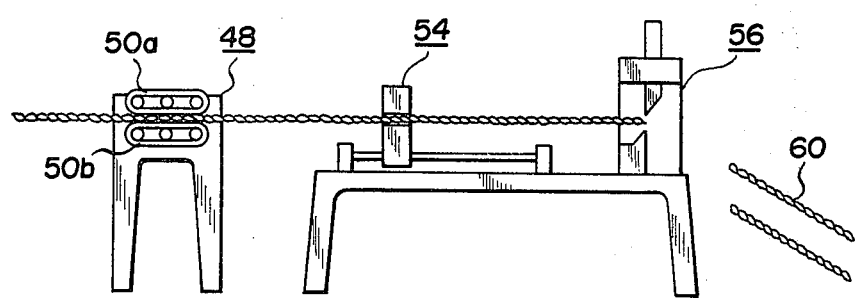
FIG. 5 is a schematic view illustrating a device for cutting the plastic turbulence members manufactured by the apparatus of FIG. 3 into pieces of a given size.

In the aforementioned process, the resin is guided to the interior of the water vessel 42 while it is rotated around its perpendicular axis by the action of the rotary nozzle 34. The resin meets with resistance both from the water in the water vessel and from the part of the resin which has been cooled and solidified and held in contact with the lower surface of the roller 44 in the state of non-rotation. Between the leading end of the nozzle 34 and the surface of the water, the resin is automatically twisted, then cooled and solidified in the water vessel and subsequently drawn continuously by the drawing device 48. Turbulence pieces 60 of a given length obtained by forwarding the turbulence member drawn from the drawing device 48 toward a feeder 54 capable of continuously feeding the turbulence member at a given dimension and cutting the turbulence member may be stored as illustrated in FIG. 5, or may be introduced directly into the fluid paths in the heat exchanger via a supply mechanism (now shown) having a suitable guide passage.

The pitch between the adjacent spiral fans of the turbulence member can be determined independently or interdependently by the extruding speed of the resin, rotating speed of the nozzle 34 and distance between the leading end of the nozzle and the surface of the water in the water vessel 42.

When a turbulence member having a half pitch is desired, for example, the rotating speed of the nozzle 34 may be increased twice.

Spiral turbulence members of configurations shown in FIGS. 6(B), 7(B) and 8(B) can be obtained by forming the slit in the shapes shown in FIGS. 6(A), 7(A) and 8(A) respectively.

As described above, the first embodiment of the present invention makes it possible to easily manufacture turbulence members having a precise and uniform outside diameter and fans of precise and uniform thickness and pitch, and entails advantages in that since the working velocity can be accelerated, the productivity is enhanced and the production cost is reduced and in, that since the turbulence members are made of a synthetic resin, the heat exchanger is lightened and the turbulence pieces are easily held straight if the turbulence member is cut even after it is rolled around the take-up reel, and consequently the troublesome manual operation for reforming the bent portions of the turbulence pieces is not required and the time and labor for the insertion of the turbulence pieces into the fluid paths are considerably decreased.

Figure 9:
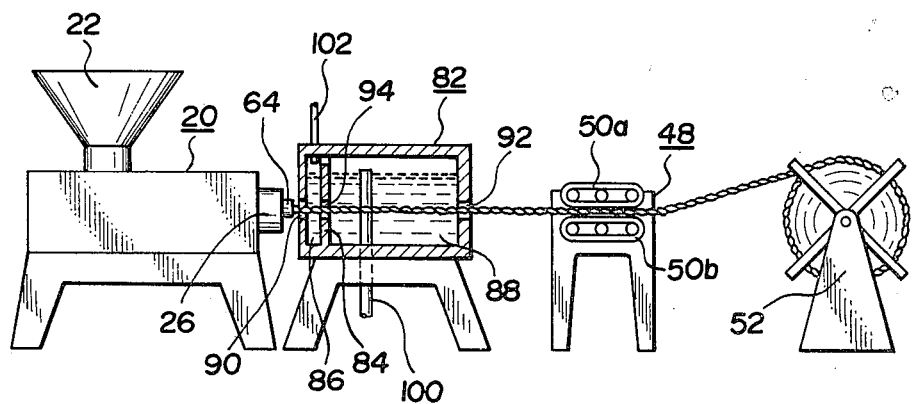
FIG. 9 is a schematic view illustrating another embodiment of the apparatus for the manufacture of plastic turbulence members according to the present invention.

The second embodiment of the apparatus according to the present invention will be described with reference to FIG. 9. In the following description, the components identical or similar to those in the first embodiment will be denoted by like numerical symbols. In FIG 9, reference numeral 20 denotes an extruding machine for melting by heat and extruding a synthetic resin, 22 a hopper, 26 a die head, and 64 a cap-shaped rotary nozzle having a structure similar to the structure of the rotary nozzle of the first embodiment and freely rotatably fitted into the lateral side of the die head 26.

Although the shape of the slit formed in the leading end of the rotary nozzle 64 in this embodiment is not illustrated concretely, it may be composed of a straight-like opening or radial openings similarly to the shapes of the slit in the first embodiment as illustrated in FIGS. 6(A), 7(A) and 8(A).

The resin melted by heat within the extruding machine 20 in this embodiment is extruded from the slit in the substantially horizontal direction while it is rotated around its central axis. Further, the direction in which the resin is extruded may slightly be inclined.

A cooling vessel 82 contains water therein and is disposed in the neighborhood of the leading end of the nozzle 64. The vessel is tightly closed on the upper portion thereof and divided into a first cooling chamber 86 on the nozzle 64 side and a second cooling chamber 88 on the other side by a partition wall 84. Apertures 90, 92 and 94 are formed respectively in the lateral wall on the nozzle 64 side, the lateral wall on the other side and the partition wall 84 of the cooling vessel to have diameters slightly larger than the diameter of the extruded resin and are all aligned with the slit of the nozzle 64 in the horizontal direction. Therefore, the resin extruded from the slit enters the first cooling chamber 86 through the aperture 90, then enters the second cooling chamber 88 through the aperture 94 and subsequently goes out of the cooling vessel 82 through the aperture 92.

Denoted by 100 is a suction pipe having one end thereof connected to a suitable suction pump (not shown) and the other end thereof pierced through the second cooling chamber 88 so as to have a position higher than the position of the apertures 90, 92 and 94 and to open to the space between the tightly closed upper surface of the second cooling chamber and the surface of the water in the second cooling chamber 88. A water-supplying pipe 102 is connected to the upper surface of the first cooling chamber 86.

The resin discharged from the aperture 92 of the second cooling chamber 88 is put under pressure between a pair of rollers 50a and 50b and drawn by a drawing device 48 at a speed synchronous with the extruding speed of the resin by the extruding machine 20 and rolled around a take-up reel 52.

The second embodiment of the apparatus according to the present invention is constructed as described above.

Now, the function of the second embodiment will be described in conjunction with the corresponding method.

The resin melted by heat within the extruding machine 20 is extruded from the slit of the rotary nozzle 64 in the substantially horizontal direction while it is rotated around its central axis by the rotation of the nozzle 64, cooled and solidified within the cooling vessel 82 by its successive passage through the apertures 90, 94 and 92, drawn by the drawing device 48 and rolled around the reel 52.

Figure 6:
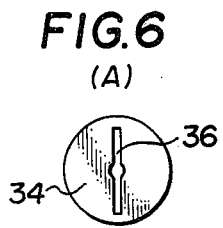
FIGS. 6(A) and (B) show one embodiment of the shape of a slit and a perspective schematic turbulence member obtained by utilization of the slit.
Figure 7:
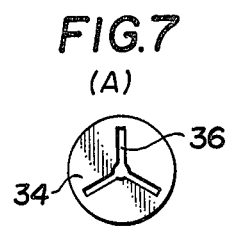
FIGS. 7(A) and (B) show another embodiment of the shape of a slit and a perspective schematic turbulence member obtained by utilization of the slit.
Figure 8:
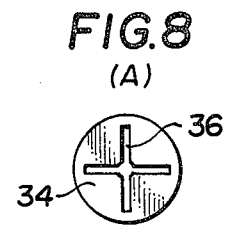
FIGS. 8(A) and (B) show still another embodiment of the shape of a slit and a perspective schematic turbulence member obtained by utilization of the slit.
Figure 6:
Figure 7:
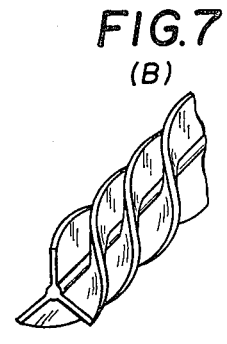
Figure 8:
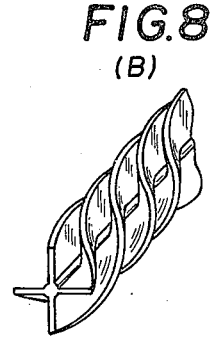

The resin is automatically spirally twisted by its own rotation around its central axis between the leading end of the nozzle 64 and the interior of the first cooling chamber 86 while it is supported by the portion of the resin which has been cooled within the cooling vessel 82, and the resin stops its rotation at the drawing device 48. The spiral shape may freely determined by appropriately adopting the shape of the slit similarly in the first embodiment (FIGS. 6, 7 and 8).

Since the air present in the cooling vessel 82 is discharged by the suction pipe 100, the space between the upper inner surface of the cooling vessel and the surface of the water in the cooling vessel is at all times kept under negative pressure and the position of the surface of the water in the cooling vessel is to be at the position of the upper end surface of the suction pipe 100 which is higher than the level of the apertures 90 and 92, with the result that the resin passed through the apertures 90, 94 and 92 is under water and is sufficiently cooled.

In this case, the negative pressure under which the aforementioned space is kept is set to be higher in numerical value than the positive pressure of the water exerted on the positions of the apertures 90 and 92 and, therefore, little water flows out of the cooling vessel through the apertures 90 and 92.

When part of the water supplied from the water-supplying pipe 102 into the cooling vessel 82, which overflows the level of the upper end of the suction pipe 100, and air which enters the cooling vessel 82 through the apertures 90 and 92 are discharged by the suction pipe, the afore-mentioned space is kept at all times under negative pressure higher in numerical value than the aforementioned water pressure.

Since the lateral wall of the first cooling chamber 86 on the nozzle 64 side can be thin because the pressure of the water exerted in the direction of the outside of the cooling vessel is decreased by the aforementioned negative pressure, the space between the leading end of the nozzle 64 and the water in the first cooling chamber can be made short to thereby sufficiently avoid deformation of the resin which may possibly occur in the space due to the leakage of the molten resin.

Further, when the lateral wall of the first cooling chamber approaches the leading end of the nozzle 64 as described above, since there is little outflow of water in the first cooling chamber through the aperture 90 toward the nozzle 64, the extrusion of the resin is not obstructed.

The pitch between the adjacent spiral fans of the turbulence member can be determined by the resin extruding speed, the rotating speed of the nozzle 64, the distance between the leading end of the nozzle 64 and the cooling vessel 82, etc.

The magnitude of the negative pressure is varied by the pulsation of a suction pump (not shown) and thereby there is a possibility of the water being oscillated within the cooling vessel 82. In the present embodiment, however, such oscillation is effectively prevented from occurring by the existence of the partition wall 84 and, as a result, the deformation of the resin within the cooling vessel can be avoided.

However, the partition wall may be omitted e.g. by using a suction pump having small pulsation.

Since the resin is extruded in the substantially horizontal direction, cooled and solidified, and drawn in the horizontal direction, as described above, there can be obtained the same function and effects as in the first embodiment. Further, since the second embodiment excludes a possibility of inconvenience which might occur due to the reversed advancing direction of the resin within the cooling vessel effected in the first embodiment, it is possible to efficiently manufacture turbulence members exellent in precision.

The present invention is not limited to the first and second embodiments. Various modifications can be made within the spirit of the present invention. For example, the resin may be extruded from the nozzle, at a relative speed different from the speed of rotation of the nozzle, while it is rotated around its central axis.

As described above, according to the present invention, it is possible to manufacture turbulence members excellent in precision at a high working speed by extruding the synthetic resin melted by heat from the slit of the rotary nozzle while it is rotated around its own axis, thereby giving spiral twist automatically to the molten resin, and passing the molten resin under water thereby cooling and solidifying the resin. Therefore, the present invention enjoys high productivity and low production cost. Further, since the weight of the plastic turbulence pieces are light, increase in weight of the heat exchanger such as a radiator can effectively be prevented, and since the turbulence pieces are easily kept straight even when the resin is cut after it has been rolled around a reel, troublesome manual operation for reforming the bent portions of the turbulence pieces, which has heretofore been required in inserting the turbulence pieces into the fluid paths in the heat exchanger, can be eliminated. Therefore, the present invention also enjoys great reduction in time and labor in comparison with the prior art.

What is claimed is:

1. In an apparatus for the manufacture of turbulence members made of a synthetic resin, which comprises:
   (a) an extruding machine provided with an extrusion outlet for melting therein a synthetic resin by heat and extruding the molten resin out of said extrusion outlet,
   (b) a rotary nozzle rotatably attached to the leading end of said extrusion outlet and provided with a slit for allowing the molten resin to be rotated around its axis and simultaneously extruded from said slit in the horizontal direction,
   (c) a water vessel filled with water and tightly closed on the upper portion thereof for cooling and solidifying therein the molten resin extruded from said slit, and
   (d) a drawing device for drawing the resin cooled and solidified in said water vessel, the improvement wherein said water vessel is divided by a partition wall into a first relatively narrow cooling chamber and a second relatively wide cooling chamber, the lateral wall of said first narrow cooling chamber on the rotary nozzle side, said partition wall and the lateral wall of said second wide cooling chamber on the drawing device side each being provided with an aperture of a diameter slightly larger than the outside diameter of the resin extruded from said slit so as to be aligned with one another, said first narrow cooling chamber being connected to a water-supplying means, and said second wide cooling chamber being connected to a suction pipe having the upper end thereof opening to the interior of said water vessel so as to be positioned at a higher level than the level of said apertures and having the lower end thereof connected to a suction pump.

* * * * *